United States Patent
Wang et al.

(10) Patent No.: US 10,778,359 B2
(45) Date of Patent: Sep. 15, 2020

(54) TIME SYNCHRONIZATION METHOD, PROGRAMMABLE LOGIC DEVICE, SINGLE BOARD AND NETWORK ELEMENT

(71) Applicant: ZTE Corporation, Shenzhen (CN)

(72) Inventors: Lilin Wang, Shenzhen (CN); Juan Wan, Shenzhen (CN); Yangfeng Wang, Shenzhen (CN); Xiaoming Fu, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 590 days.

(21) Appl. No.: 15/744,458

(22) PCT Filed: Dec. 12, 2014

(86) PCT No.: PCT/CN2014/093744
§ 371 (c)(1),
(2) Date: Jan. 12, 2018

(87) PCT Pub. No.: WO2015/117501
PCT Pub. Date: Aug. 13, 2015

(65) Prior Publication Data
US 2018/0205476 A1  Jul. 19, 2018

(30) Foreign Application Priority Data

Jul. 16, 2014  (CN) .......................... 2014 1 0339342

(51) Int. Cl.
H04J 3/06 (2006.01)
H04L 7/04 (2006.01)

(52) U.S. Cl.
CPC .......... *H04J 3/0655* (2013.01); *H04J 3/0697* (2013.01); *H04L 7/04* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 5,873,119 A | 2/1999 | Khanderkar | |
| 7,085,276 B1* | 8/2006 | Heitmann | G06F 1/14 370/395.4 |
| 2010/0287402 A1* | 11/2010 | Kim | H04J 3/067 713/400 |

(Continued)

FOREIGN PATENT DOCUMENTS

| | | |
|---|---|---|
| CN | 101459502 A | 6/2009 |
| CN | 101739011 A | 6/2010 |

(Continued)

OTHER PUBLICATIONS

International Search Report for corresponding application No. PCT/CN2014/093744 filed on Dec. 12, 2014; dated Apr. 22, 2015.

Primary Examiner — Kwang B Yao
Assistant Examiner — Juvena W Loo
(74) Attorney, Agent, or Firm — Cantor Colburn LLP

(57) ABSTRACT

A time synchronization method, a programmable logic device, a single board and a network element are provided. In the method, a programmable logic device receives a request message from a terminal, generates a time synchronization message according to the request message, and sends the time synchronization message to the terminal.

18 Claims, 2 Drawing Sheets

(56) References Cited

U.S. PATENT DOCUMENTS

2012/0170631 A1* 7/2012 Liu ...................... H04J 3/0667
375/224

FOREIGN PATENT DOCUMENTS

| CN | 102783079 A | 11/2012 |
|---|---|---|
| CN | 103067112 A | 4/2013 |
| CN | 103795520 A | 5/2014 |

* cited by examiner

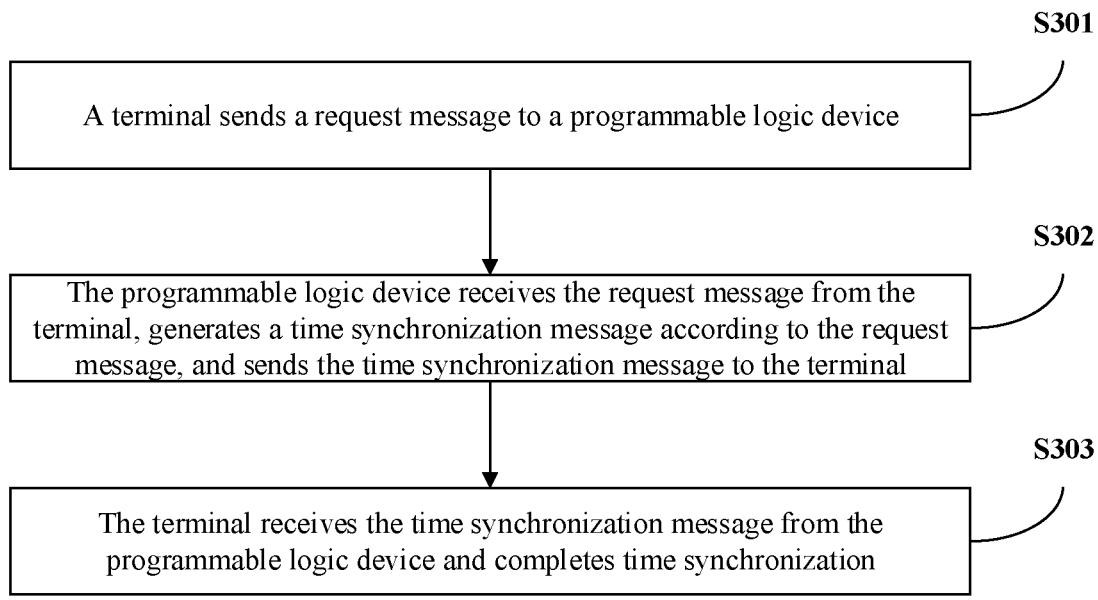
Fig. 3
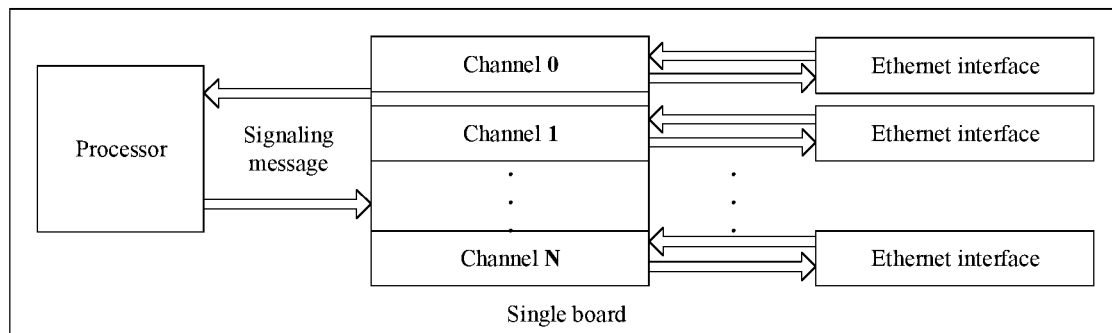
Fig. 4
| Expansion board | Expansion board |
|---|---|
| Expansion board | Expansion board |
| Standby clock board | Expansion board |
| Primary clock board | Expansion board |
Fig. 5

US 10,778,359 B2

TIME SYNCHRONIZATION METHOD, PROGRAMMABLE LOGIC DEVICE, SINGLE BOARD AND NETWORK ELEMENT

CROSS-REFERENCE TO RELATED APPLICATION

This application is the National Stage of International Application No. PCT/CN2014/093744, filed Dec. 12, 2014, which claims the benefit of Chinese Patent Application No. 201410339342.6, filed Jul. 16, 2014.

TECHNICAL FIELD

The present disclosure relates to the technical field of communications, and more particularly to a time synchronization method, a programmable logic device, a single board and a network element.

BACKGROUND

With the continuous development of communication technologies, the industry is devoted to achieving time synchronization. Two protocols, namely a Network Time Protocol (NTP) and a Precision Timing Protocol (PTP) (i.e., IEEE1588), have been developed for time synchronization between various pieces of network equipment. According to the PTP, clocks of all nodes in a network may be periodically synchronized through a synchronization signal by utilizing a Global Navigation Satellite System (GNSS) or Building Integrated Timing System (BITS) clock as a clock source. By virtue of the PTP, an Ethernet-based system may achieve precision synchronization, synchronization between all systems may be realized, and the synchronization precision may achieve a microsecond level or even higher. According to the NTP, a round-trip delay of a data packet in an Ethernet network may be estimated to make equipment synchronize with a server or clock source (such as a quartz clock, a rubidium clock and a Global Positioning System (GPS)). By virtue of the NTP, high-precision time correction may be provided, and a reliable time source of 1 to 50 ms may be provided.

In a networking solution of radio communications, equipment serving as a primary clock provider not only needs to be able to provide a general NTP synchronization, but also needs to satisfy a PTP synchronization demand for a specific user. Base Station Controller (BSC)/Radio Network Controller (RNC) equipment having both NTP and PTP functions may complete receiving and sending of NTP and PTP messages at a Central Processing Unit (CPU). However, a CPU processing system may need to complete receiving and sending of a message under the driving of software interruption. Under the limitation of such CPU architecture, the BSC/RNC providing NTP and PTP clock timing functions can load limited user capacity. Furthermore, large-capacity packet transceiving equipment having both NTP and PTP functions is extremely prominent in large-scale networking application of home base stations/micro base stations, and large-scale centralized timing equipment which cannot provide NTP and PTP functions respectively results in that the existing home base station/micro base station networking solution cannot reduce the time synchronization cost of network equipment to the greatest extent.

SUMMARY

Some embodiments of the present disclosure provide a time synchronization method, a programmable logic device, a single board and a network element, which may at least solve a problem of insufficient packet sending capability caused by a fact that a time synchronization response needs to be completed by software interruption due to limitation of a CPU architecture.

To solve the abovementioned problem, an embodiment of the present disclosure provides a time synchronization method, which may include the acts as follows.

A programmable logic device receives a request message from a terminal.

The programmable logic device generates a time synchronization message according to the request message.

The programmable logic device sends the time synchronization message to the terminal.

In an embodiment of the present disclosure, the act that a programmable logic device receives a request message from a terminal may include the following operations.

The programmable logic device receives a connection setup request message from the terminal.

Or, the programmable logic device receives a time synchronization request message from the terminal.

In an embodiment of the present disclosure, the act that the programmable logic device generates a time synchronization message according to the request message may include the following operations.

The programmable logic device acquires local reference time information, configuration indication information, and recognition information of the terminal according to the request message.

The programmable logic device generates the time synchronization message according to the local reference time information, the configuration indication information, and the recognition information of the terminal.

In an embodiment of the present disclosure, when the programmable logic device receives the connection setup request message from the terminal, the act that the programmable logic device generates a time synchronization message according to the request message may include the following operations.

The programmable logic device sends the connection setup request message to a CPU.

The programmable logic device receives the configuration indication information and the recognition information of the terminal from the CPU.

The programmable logic device acquires the local reference time information according to the configuration indication information.

The programmable logic device generates, according to the configuration indication information, the recognition information of the terminal and the local reference time information, a time synchronization initiating message as the time synchronization message.

In an embodiment of the present disclosure, when the programmable logic device receives the time synchronization request message from the terminal, the act that the programmable logic device generates a time synchronization message according to the request message may include the following operations.

The programmable logic device parses the time synchronization request message, and acquires type identification information of the time synchronization request message and recognition information of the terminal.

The programmable logic device acquires configuration indication information and local reference time information according to the type identification information.

The programmable logic device generates, according to the configuration indication information, the recognition information of the terminal and the local reference time information, a time synchronization response message as the time synchronization message.

In an embodiment of the present disclosure, when identification information of the connection setup request message indicates the connection setup request message as a PTP request message, the local reference time information acquired by the programmable logic device is local PTP reference time information, and the received configuration indication information is PTP configuration indication information.

In an embodiment of the present disclosure, when identification information of the connection setup request message indicates the connection setup request message as an NTP request message, the local reference time information acquired by the programmable logic device is local NTP reference time information, and the received configuration indication information is NTP configuration indication information.

In an embodiment of the present disclosure, when identification information of the time synchronization request message indicates the time synchronization request message as a PTP request message, the local reference time information and configuration indication information acquired by the programmable logic device are local PTP reference time information and PTP configuration indication information respectively.

In an embodiment of the present disclosure, when identification information of the time synchronization request message indicates the time synchronization request message as an NTP request message, the local reference time information and configuration indication information acquired by the programmable logic device are local NTP reference time information and NTP configuration indication information respectively.

In an embodiment of the present disclosure, when the identification information of the connection setup request message or the time synchronization request message indicates the connection setup request message or the time synchronization request message as a PTP request message, the programmable logic device may acquire local PTP reference time information in a following manner.

Clock source information is acquired.

Local clock information is synchronized according to the clock source information.

The local PTP reference time information is acquired according to the local clock information.

In an embodiment of the present disclosure, when the identification information of the connection setup request message or the time synchronization request message indicates the connection setup request message or the time synchronization request message as an NTP request message, the programmable logic device may acquire local NTP reference time information in a following manner.

Clock source information is acquired.

Local clock information is synchronized according to the clock source information.

Local PTP reference time information is acquired according to the local clock information.

The local PTP reference time information is converted into the local NTP reference time information.

In an embodiment of the present disclosure, before the programmable logic device sends the time synchronization message to the terminal, the method may further include the acts as follows.

The programmable logic device extracts state information of the time synchronization message.

The programmable logic device sends the state information out.

In an embodiment of the present disclosure, the programmable logic device may be located in a Physical (PHY) layer.

Another embodiment of the present disclosure provides a time synchronization method. The method may include the acts as follows.

A terminal sends a request message to a programmable logic device.

The programmable logic device receives the request message from the terminal, generates a time synchronization message according to the request message, and sends the time synchronization message to the terminal.

The terminal receives the time synchronization message from the programmable logic device and completes time synchronization.

Still another embodiment of the present disclosure provides a programmable logic device, which may include a receiving module, a processing module and a sending module.

The receiving module is configured to receive a request message from a terminal.

The processing module is configured to generate a time synchronization message according to the request message received by the receiving module.

The sending module is configured to send the time synchronization message generated by the processing module to the terminal.

In an embodiment of the present disclosure, the receiving module may be configured to receive a connection setup request message or a time synchronization request message from the terminal.

In an embodiment of the present disclosure, the processing module may include an acquisition module and a generation module.

The acquisition module is configured to acquire local reference time information, configuration indication information, and recognition information of the terminal according to the request message received by the receiving module.

The generation module is configured to generate the time synchronization message according to the local reference time information, the configuration indication information, and the recognition information of the terminal, which are acquired by the acquisition module.

In an embodiment of the present disclosure, when the receiving module receives the connection setup request message from the terminal, the sending module may be further configured to send the connection setup request message to a CPU;

the receiving module may be further configured to receive the configuration indication information and the recognition information of the terminal from the CPU;

the acquisition module may be configured to acquire the local reference time information according to the configuration indication information; and the generation module may be configured to generate, according to the configuration indication information, the recognition information of the terminal and the local reference time information, a time synchronization initiating message as the time synchronization message.

In an embodiment of the present disclosure, when the receiving module receives a time synchronization request message from the terminal, the processing module may further include a parsing module which is configured to parse the time synchronization request message, and acquire type identification information of the time synchronization request message and recognition information of the terminal;

the acquisition module is configured to acquire configuration indication information and local reference time information according to the type identification information acquired by the parsing module; and the generation module is configured to generate, according to the configuration indication information, the recognition information of the terminal and the local reference time information, a time synchronization response message as the time synchronization message.

In an embodiment of the present disclosure, when identification information of the connection setup request message received by the receiving module indicates the connection setup request message as a PTP request message, the local reference time information acquired by the acquisition module may be local PTP reference time information, and the configuration indication information received by the receiving module may be PTP configuration indication information.

In an embodiment of the present disclosure, when identification information of the connection setup request message received by the receiving module indicates the connection setup request message as an NTP request message, the local reference time information acquired by the acquisition module may be local NTP reference time information, and the configuration indication information received by the receiving module may be NTP configuration indication information.

In an embodiment of the present disclosure, when identification information of the time synchronization request message received by the receiving module indicates the time synchronization request message as a PTP request message, the local reference time information and configuration indication information acquired by the acquisition module may be local PTP reference time information and PTP configuration indication information respectively.

In an embodiment of the present disclosure, when identification information of the time synchronization request message received by the receiving module indicates the time synchronization request message as an NTP request message, the local reference time information and configuration indication information acquired by the acquisition module may be local NTP reference time information and NTP configuration indication information respectively.

In an embodiment of the present disclosure, when the identification information of the connection setup request message or the time synchronization request message indicates the connection setup request message or the time synchronization request message as a PTP request message, the acquisition module may be configured to acquire clock source information, synchronize local clock information according to the clock source information, and acquire local PTP reference time information according to the local clock information.

In an embodiment of the present disclosure, when the identification information of the connection setup request message or the time synchronization request message indicates the connection setup request message or the time synchronization request message as an NTP request message, the acquisition module may be configured to acquire clock source information, synchronize local clock information according to the clock source information, acquire local PTP reference time information according to the local clock information, and convert the local PTP reference time information into the local NTP reference time information.

In an embodiment of the present disclosure, the processing module may further include an extraction module.

The extraction module is configured to extract state information of the time synchronization message.

The sending module is configured to send out the state information extracted by the extraction module.

Still another embodiment of the present disclosure provides a single board, which may include an interface as well as the abovementioned programmable logic device, the programmable logic device being connected to a terminal via the interface.

In an embodiment of the present disclosure, the programmable logic device may be located in a PHY layer.

Still another embodiment of the present disclosure provides a network element, which may include the abovementioned single board, the single board being externally connected with at least one terminal.

BRIEF DESCRIPTION OF THE DRAWINGS

FIG. 3 is a flowchart of a time synchronization method provided in a third embodiment of the present disclosure;

FIG. 4 is a structural diagram of a single board provided in a fourth embodiment of the present disclosure; and FIG. 5 is a structural diagram of an expansion application design of a machine frame single board provided in a fifth embodiment of the present disclosure.

DETAILED DESCRIPTION OF THE EMBODIMENTS

The solutions in the embodiments of the present disclosure will be clearly and completely described hereinbelow with the drawings in the embodiments of the present disclosure. Obviously, the described embodiments are only part of the embodiments of the present disclosure, not all of the embodiments. Based on the embodiments of the present disclosure, all other embodiments obtained on the premise of no creative work of a person of ordinary skill in the art should fall within the scope of protection defined by the appended claims of the present disclosure.

The embodiments of the present disclosure are elaborated hereinbelow with the detailed description and the drawings.

First Embodiment

Figure 1:
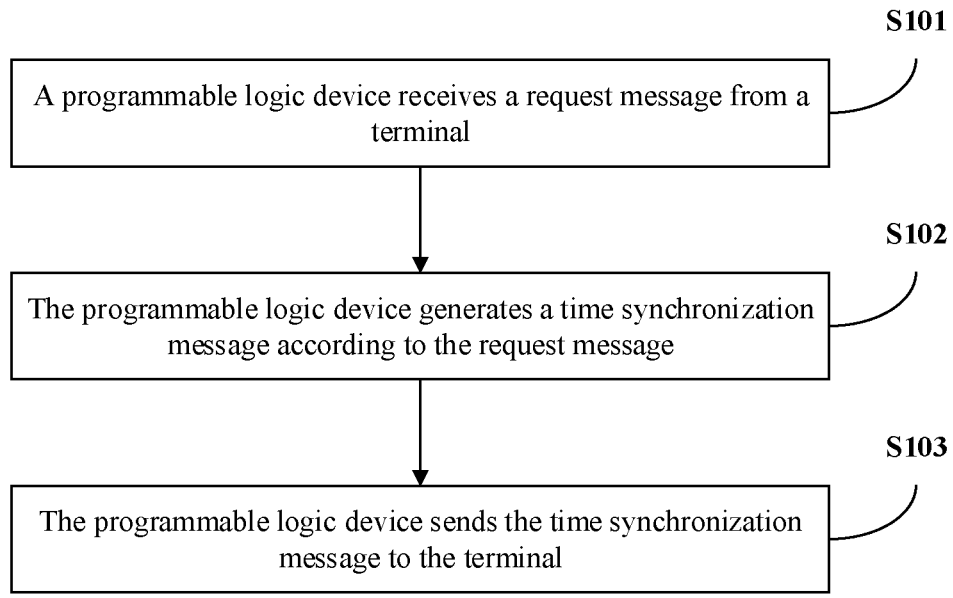
FIG. 1 is a flowchart of a time synchronization method provided in a first embodiment of the present disclosure.

FIG. 1 is a flowchart of a time synchronization method provided in a first embodiment of the present disclosure. As shown in FIG. 1, the time synchronization method may include the acts as follows.

At act S101, a programmable logic device may receive a request message from a terminal.

Specifically, the terminal may communicate and interact with a CPU or the programmable logic device in real time, so as to complete corresponding functions.

When the terminal needs to perform connection setup communication, the terminal may generate a connection setup request message, and send the connection setup request message to the programmable logic device. Since the programmable logic device can communicate and interact with the terminal in real time, the programmable logic device may receive and recognize the connection setup request message sent by the terminal by parsing all of the received messages.

When the terminal needs to perform time synchronization interaction, the terminal may generate a time synchronization request message, and send the time synchronization request message to the programmable logic device. Since the programmable logic device can communicate and interact with the terminal in real time, the programmable logic device may receive and recognize the time synchronization request message sent by the terminal by parsing all of the received messages.

In the present embodiment, the programmable logic device may be located in a PHY layer in a network, and therefore all processes made by the programmable logic device are completed in the PHY layer. Furthermore, the programmable logic device may include at least one channel and one Ethernet interface often corresponds to one channel, the process for only one of the channels is illustrated herein, and such process also applies to the other channels.

At act S102, the programmable logic device may generate a time synchronization message according to the request message.

Specifically, the reception of the request message by the programmable logic device from the terminal may trigger generation of a time synchronization message, so as to complete the time synchronization of the terminal. In the present embodiment, when the programmable logic device receives the request message, the programmable logic device may acquire local reference time information, configuration indication information and recognition information of the, and may add the local reference time information, the configuration indication information and the recognition information of the terminal into different fields respectively to generate a time synchronization message. Herein, the local reference time information is used to provide reference time for the terminal, the configuration indication information is used to indicate message contents needed when the programmable logic device configures a time synchronization initiating message or a time synchronization response message, and the recognition information of the terminal is used to represent address information of the terminal.

In the present embodiment, when the programmable logic device receives a connection setup request message from the terminal, the programmable logic device may send the connection setup request message to the CPU. The CPU may parse the received connection setup request message to obtain a connection setup response message, type identification information of the connection setup request message and recognition information of the terminal, acquire configuration indication information according to the identification information, and send the connection setup response message, the configuration indication information and the recognition information of the terminal to the programmable logic device through a configuration interface of the programmable logic device. The programmable logic device may receive the connection setup response message, the configuration indication information and the recognition information of the terminal, which are sent by the CPU, and the programmable logic device may acquire the local reference time information according to the configuration indication information. The programmable logic device may generate a time synchronization initiating message according to the configuration indication information, the recognition information of the terminal and the local reference time information, and take the time synchronization initiating message as a time synchronization message for completing the time synchronization of the terminal.

In the abovementioned embodiment, when the type identification information of the connection setup request message indicates the connection setup request message as a PTP request message, the CPU may acquire PTP configuration indication information according to the identification information, and send the connection setup response message, the PTP configuration indication information and the recognition information of the terminal to the programmable logic device through the configuration interface of the programmable logic device. The configuration indication information received by the programmable logic device is PTP configuration indication information, and local reference time information acquired by the programmable logic device according to the PTP configuration indication information is local PTP reference time information. When the type identification information of the connection setup request message indicates the connection setup request message as an NTP request message, the CPU may acquire NTP configuration indication information according to the identification information, and send the connection setup response message, the NTP configuration indication information and the recognition information of the terminal to the programmable logic device through the configuration interface of the programmable logic device. The configuration indication information received by the programmable logic device is NTP configuration indication information, and local reference time information acquired by the programmable logic device according to the NTP configuration indication information is local NTP reference time information.

In the abovementioned embodiment, a manner of acquiring the local PTP reference time information may include, but not limited to, the following manner. Since the programmable logic device can acquire clock source (GNSS or BITS) information in real time and synchronize local clock information in real time according to the clock source information, the local PTP reference time information can be acquired according to the local clock information to serve as timestamp information of a time synchronization initiating message. A manner of acquiring the local NTP reference time information may include, but not limited to, the following manner. Since the programmable logic device can acquire clock source (GNSS or BITS) information in real time and synchronize local clock information in real time according to the clock source information, the local PTP reference time information can be acquired according to the local clock information, and the local PTP reference time information is subjected to algorithm conversion to generate the local NTP reference time information to serve as timestamp information of a time synchronization initiating message. It may be appreciated that as long as the local PTP reference time information or the local NTP reference time information can be acquired, any acquisition manner can be adopted.

In the present embodiment, when the programmable logic device receives a time synchronization request message from the terminal, the programmable logic device may parse the time synchronization request message, acquire type identification information of the time synchronization request message and recognition information of the terminal, and then acquire local reference time information and configuration indication information configured in the programmable logic device according to the identification information. The programmable logic device may generate a time synchronization response message according to the configuration indication information, the recognition information of the terminal and the local reference time information, and take the time synchronization response message as a time synchronization message for completing the time synchronization of the terminal.

In the abovementioned embodiment, when type identification information of the time synchronization request message indicates the time synchronization request message as a PTP request message, the programmable logic device may acquire local PTP reference time information and PTP configuration indication information according to the identification information. When type identification information of the time synchronization request message indicates the time synchronization request message as an NTP request message, the programmable logic device may acquire local NTP reference time information and NTP configuration indication information according to the identification information.

In the abovementioned embodiment, a manner of acquiring the local PTP reference time information may include, but not limited to, the following manner. Since the programmable logic device can acquire clock source (GNSS or BITS) information in real time and synchronize local clock information in real time according to the clock source information, the local PTP reference time information may be acquired according to the local clock information to serve as timestamp information of a time synchronization response message. A manner of acquiring the local NTP reference time information may include, but not limited to, the following manner. Since the programmable logic device can acquire clock source (GNSS or BITS) information in real time and synchronize local clock information in real time according to the clock source information, the local PTP reference time information may be acquired according to the local clock information, and the local PTP reference time information may be subjected to algorithm conversion to generate the local NTP reference time information to serve as timestamp information of a time synchronization initiating message. It may be appreciated that as long as the local PTP reference time information or the local NTP reference time information can be acquired, any acquisition manner can be adopted.

In the abovementioned solution, when type identification information of the connection setup request message or time synchronization request message indicates a PTP request message, the following two manners may be adopted according to supporting modes preset for a channel by the programmable logic device.

(1) When the channel supports a one-way mode, local PTP reference time information, PTP configuration indication information and recognition information of the terminal may be framed to generate a sync message and an announce message, and the sync message and the announce message are taken as PTP time synchronization initiating messages.

(2) When the channel supports a two-way mode, local PTP reference time information, PTP configuration indication information and recognition information of the terminal may be framed to generate a sync message and an announce message. Meanwhile, the programmable logic device may parse a time synchronization request message sent by the terminal to obtain PTP configuration indication information and recognition information of the terminal needed for generation of a response message. The programmable logic device may perform framing according to the local PTP reference time information, the PTP configuration indication information and the recognition information of the terminal to generate a response message, take the sync message and the announce message as PTP time synchronization initiating messages, and take the response message as a PTP time synchronization response message.

In the present embodiment, since the programmable logic device may include at least one channel, after the programmable logic device receives a connection setup request message from the terminal, N Ethernet channels in the programmable logic device may set up connection with the CPU. Based on the advantages that the CPU processes only a small number of connection setup request messages, multi-channel NTP and PTP functions may be supported by utilizing CPU resources. Connection setup request messages of multiple channels may be converged, through switch, to the CPU for connection setup and communication. Connection setup request messages responded by the CPU may be distributed to each channel and then sent to the terminal through each channel for completing a response of a CPU device to the terminal. The essence is to form connection and communication between the terminal and the CPU, and store, by the CPU, configuration information of the terminal and recognition information of the terminal into the programmable logic device through a configuration interface of the programmable logic device. By virtue of this solution, the programmable logic device can directly generate a time synchronization response message when the terminal sends a time synchronization request message.

At act S103, the programmable logic device may send the time synchronization message to the terminal.

Specifically, after generating a time synchronization message, the programmable logic device may send the time synchronization message to the corresponding terminal, so that the terminal may complete time synchronization.

In the present embodiment, when the programmable logic device receives a connection setup request message from the terminal, the programmable logic device may send the connection setup request message to the CPU. The CPU may obtain a connection setup response message by parsing the connection setup request message, and then send the connection setup response message to the programmable logic device. After receiving the connection setup response message sent by the CPU, the programmable logic device may send the connection setup response message to the corresponding terminal, so that the terminal may complete connection setup communication. Furthermore, the programmable logic device may send the time synchronization initiating message to the corresponding terminal, so that the terminal may complete time synchronization. After generating a time synchronization response message upon receiving the time synchronization request message from the terminal, the programmable logic device may send the time synchronization response message to the corresponding terminal, so that the terminal may complete time synchronization.

In the present embodiment, before sending the connection setup response message, the time synchronization initiating message and the time synchronization response message, the programmable logic device may judge a priority sequence or time sequence of the connection setup response message, the time synchronization initiating message and the time synchronization response message to obtain a judgment result. The programmable logic device may send the connection setup response message, the time synchronization initiating message and the time synchronization response message to the corresponding terminal according to the judgment result. That is, the programmable logic device may sort the connection setup response message, the time synchronization initiating message and the time synchronization response message in a descending order according to the priority sequence or sort the connection setup response message, the time synchronization initiating message and the time synchronization response message according to a time sequence, and send the connection setup response message, the time synchronization initiating message and the time synchronization response message to the terminal.

In the present embodiment, before sending the connection setup response message, the time synchronization initiating message and the time synchronization response message, the programmable logic device may extract state information of the connection setup response message, the time synchronization initiating message and the time synchronization response message, and send and store the state information into the CPU or memory. The state information is mainly used to query whether the connection setup response message, the time synchronization initiating message and the time synchronization response message are correctly and continuously sent during sending, i.e., whether a phenomenon of error or packet loss shows up.

Second Embodiment

Figure 2:
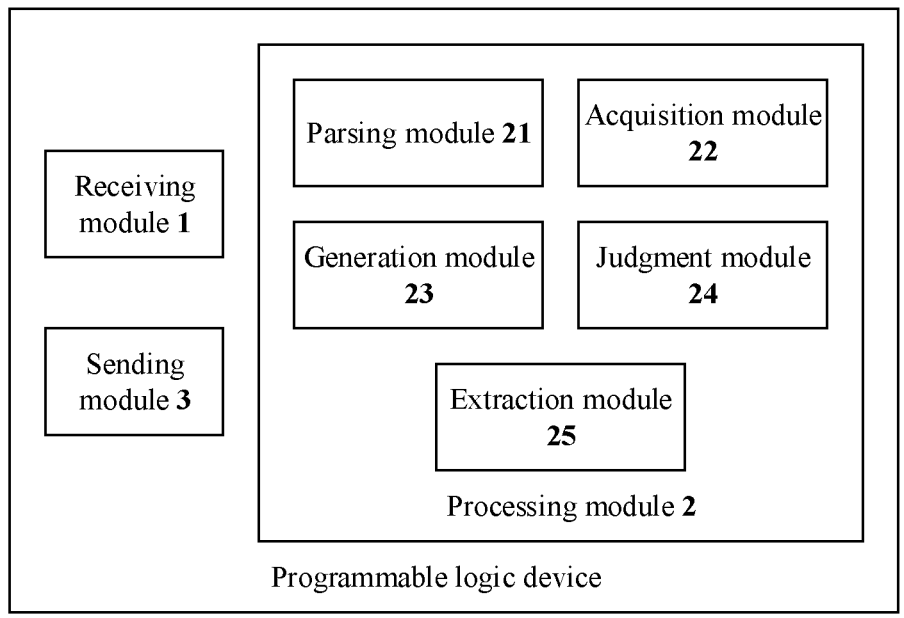
FIG. 2 is a structural diagram of a programmable logic device provided in a second embodiment of the present disclosure.

FIG. 2 is a structural diagram of a programmable logic device provided in a second embodiment of the present disclosure. As shown in FIG. 2, the programmable logic device may include a receiving module 1, a processing module 2 and a sending module 3.

The receiving module 1 may be configured to receive a request message from a terminal.

The processing module 2 may be configured to generate a time synchronization message according to the request message received by the receiving module 1.

The sending module 3 may be configured to send the time synchronization message generated by the processing module 2 to the terminal.

Specifically, the terminal may communicate and interact with a CPU or the programmable logic device in real time, so as to complete corresponding functions. The programmable logic device may be located in a PHY layer in a network, and therefore all processes made by the programmable logic device are completed in the PHY layer.

When the terminal needs to perform connection setup communication, the terminal may generate a connection setup request message, and send the connection setup request message to the programmable logic device. Since the programmable logic device can communicate and interact with the terminal in real time, the programmable logic device can parse all of the received messages, and the receiving module 1 may receive and recognize the connection setup request message sent by the terminal.

When the terminal needs to perform time synchronization interaction, the terminal may generate a time synchronization request message, and send the time synchronization request message to the programmable logic device. Since the programmable logic device can communicate and interact with the terminal in real time, the programmable logic device can parse all of the received messages, and the receiving module 1 may receive and recognize the time synchronization request message sent by the terminal.

In the present embodiment, the processing module 2 may include an acquisition module 22 and a generation module 23. When the receiving module 1 receives the request message from the terminal, the generation module 23 may be triggered to generate a time synchronization message for completing the time synchronization of the terminal. In the present embodiment, when the receiving module 1 receives the request message, the acquisition module 22 may acquire local reference time information, configuration indication information and recognition information of the terminal. The generation module 23 may add the local reference time information, the configuration indication information and the recognition information of the terminal into different fields respectively to generate a time synchronization message. Herein, the local reference time information is used to provide reference time for the terminal, the configuration indication information is used to indicate message contents needed when the programmable logic device configures a time synchronization initiating message or a time synchronization response message, and the recognition information of the terminal is used to represent address information of the terminal.

In the present embodiment, when the receiving module 1 receives a connection setup request message from the terminal, the sending module 3 may send the connection setup request message to the CPU. The CPU may parse the received connection setup request message to obtain a connection setup response message, type identification information of the connection setup request message and recognition information of the terminal, acquire configuration indication information according to the identification information, and send the connection setup response message, the configuration indication information and the recognition information of the terminal to the programmable logic device through a configuration interface of the programmable logic device. The receiving module 1 may receive the connection setup response message, the configuration indication information and the recognition information of the terminal, which are sent by the CPU. The acquisition module 22 may acquire the local reference time information according to the configuration indication information. The generation module 23 may generate a time synchronization initiating message according to the configuration indication information, the recognition information of the terminal and the local reference time information, and take the time synchronization initiating message as a time synchronization message for completing the time synchronization of the terminal.

In the abovementioned embodiment, when the type identification information of the connection setup request message indicates the connection setup request message as a PTP request message, the CPU may acquire PTP configuration indication information according to the identification information, and send the connection setup response message, the PTP configuration indication information and the recognition information of the terminal to the programmable logic device through the configuration interface of the programmable logic device. The configuration indication information received by the receiving module 1 is PTP configuration indication information, and local reference time information acquired by the acquisition module 22 according to the PTP configuration indication information is local PTP reference time information. When the type identification information of the connection setup request message indicates the connection setup request message as an NTP request message, the CPU may acquire NTP configuration indication information according to the identification information, and send the connection setup response message, the NTP configuration indication information and the recognition information of the terminal to the programmable logic device through the configuration interface of the programmable logic device. The configuration indication information received by the receiving module 1 is NTP configuration indication information, and local reference time information acquired by the acquisition module 22 according to the NTP configuration indication information is local NTP reference time information.

In the abovementioned embodiment, a manner of acquiring the local PTP reference time information may include, but not limited to, the following manner. Since the acquisition module 22 can acquire clock source (GNSS or BITS) information in real time and synchronize local clock information in real time according to the clock source information, the local PTP reference time information can be acquired according to the local clock information to serve as timestamp information of a time synchronization initiating message. A manner of acquiring the local NTP reference time information may include, but not limited to, the following manner. Since the acquisition module 22 can acquire clock source (GNSS or BITS) information in real time and synchronize local clock information in real time according to the clock source information, the local PTP reference time information can be acquired according to the local clock information, and the local PTP reference time information is subjected to algorithm conversion to generate the local NTP reference time information to serve as timestamp information of a time synchronization initiating message. It may be appreciated that as long as the local PTP reference time information or the local NTP reference time information can be acquired, any acquisition manner can be adopted.

In the present embodiment, the processing module 2 may further include a parsing module 21. When the receiving module 1 receives a time synchronization request message from the terminal, the parsing module 21 may parse the time synchronization request message, and acquire type identification information of the time synchronization request message and recognition information of the terminal. The acquisition module 22 may acquire local reference time information and configuration indication information configured in the programmable logic device according to the identification information. The generation module 23 may generate a time synchronization response message according to the configuration indication information, the recognition information of the terminal and the local reference time information, and take the time synchronization response message as a time synchronization message for completing the time synchronization of the terminal.

In the abovementioned embodiment, when type identification information of the time synchronization request message indicates the time synchronization request message as a PTP request message, the acquisition module 22 may acquire local PTP reference time information and PTP configuration indication information according to the identification information. When type identification information of the time synchronization request message indicates the time synchronization request message as an NTP request message, the acquisition module 22 may acquire local NTP reference time information and NTP configuration indication information according to the identification information.

In the abovementioned embodiment, a manner of acquiring the local PTP reference time information may include, but not limited to, the following manner. Since the acquisition module 22 can acquire clock source (GNSS or BITS) information in real time and synchronize local clock information in real time according to the clock source information, the local PTP reference time information may be acquired according to the local clock information to serve as timestamp information of a time synchronization response message. A manner of acquiring the local NTP reference time information may include, but not limited to, the following manner. Since the acquisition module 22 can acquire clock source (GNSS or BITS) information in real time and synchronize local clock information in real time according to the clock source information, the local PTP reference time information may be acquired according to the local clock information, and the local PTP reference time information may be subjected to algorithm conversion to generate the local NTP reference time information to serve as timestamp information of a time synchronization initiating message. It may be appreciated that as long as the local PTP reference time information or the local NTP reference time information can be acquired, any acquisition manner can be adopted.

In the abovementioned solution, when type identification information of the connection setup request message or time synchronization request message indicates a PTP request message, the following two manners may be adopted according to supporting modes preset for a channel by the programmable logic device.

(1) When the channel supports a one-way mode, the generation module 23 may frame local PTP reference time information, PTP configuration indication information and recognition information of the terminal to generate a sync message and an announce message, and take the sync message and the announce message as PTP time synchronization initiating messages.

(2) When the channel supports a two-way mode, the generation module 23 may frame local PTP reference time information, PTP configuration indication information and recognition information of the terminal to generate a sync message and an announce message. Meanwhile, the parsing module 21 may parse a time synchronization request message sent by the terminal to obtain PTP configuration indication information and recognition information of the terminal needed for generation of a response message. The generation module 23 may perform framing according to the local PTP reference time information, the PTP configuration indication information and the recognition information of the terminal to generate a response message, take the sync message and the announce message as PTP time synchronization initiating messages, and take the response message as a PTP time synchronization response message.

Specifically, after generating a time synchronization message, the programmable logic device may send the time synchronization message to the corresponding terminal, so that the terminal may complete time synchronization.

In the present embodiment, when the receiving module 1 receives a connection setup request message from the terminal, the sending module 3 may send the connection setup request message to the CPU. The CPU may obtain a connection setup response message by parsing the connection setup request message, and then send the connection setup response message to the programmable logic device. After receiving the connection setup response message sent by the CPU, the receiving module 1 may send the connection setup response message to the corresponding terminal, so that the terminal may complete connection setup communication. Furthermore, the sending module 3 may send the time synchronization initiating message to the corresponding terminal, so that the terminal may complete time synchronization. After the generation module 23 generates a time synchronization response message when the receiving module 1 receives the time synchronization request message from the terminal, the sending module 3 may send the time synchronization response message to the corresponding terminal, so that the terminal may complete time synchronization.

In the present embodiment, the processing module 2 may further include a judgment module 24. Before the sending module 3 sends the connection setup response message, the time synchronization initiating message and the time synchronization response message, the judgment module 24 may judge a priority sequence or time sequence of the connection setup response message, the time synchronization initiating message and the time synchronization response message to obtain a judgment result. The sending module 3 may send the connection setup response message, the time synchronization initiating message and the time synchronization response message to the corresponding terminal according to the judgment result. That is, the sending module 3 may sort the connection setup response message, the time synchronization initiating message and the time synchronization response message in a descending order according to the priority sequence or sort the connection setup response message, the time synchronization initiating message and the time synchronization response message according to a time sequence, and send the connection setup response message, the time synchronization initiating message and the time synchronization response message to the terminal.

In the present embodiment, the processing module 2 may further include an extraction module 25. Before the sending module 3 sends the connection setup response message, the time synchronization initiating message and the time synchronization response message, the extraction module 25 may extract state information of the connection setup response message, the time synchronization initiating message and the time synchronization response message. The sending module 3 may send and store the state information into the CPU or memory. The state information is mainly used to query whether the connection setup response message, the time synchronization initiating message and the time synchronization response message are correctly and continuously sent during sending, i.e., whether a phenomenon of error or packet loss shows up.

Third Embodiment

FIG. 3 is a flowchart of a time synchronization method provided in a third embodiment of the present disclosure. As shown in FIG. 3, the time synchronization method may include the acts as follows.

At act S301, a terminal may send a request message to a programmable logic device.

At act S302, the programmable logic device may receive the request message from the terminal, generate a time synchronization message according to the request message, and send the time synchronization message to the terminal.

At act S303, the terminal may receive the time synchronization message from the programmable logic device and completes time synchronization.

Specifically, the terminal may communicate and interact with a CPU or the programmable logic device in real time, so as to complete corresponding functions.

When the terminal needs to perform connection setup communication, the terminal may generate a connection setup request message, and send the connection setup request message to the programmable logic device. Since the programmable logic device can communicate and interact with the terminal in real time, the programmable logic device may receive and recognize the connection setup request message sent by the terminal by parsing all of the received messages.

When the terminal needs to perform time synchronization interaction, the terminal may generate a time synchronization request message, and send the time synchronization request message to the programmable logic device. Since the programmable logic device can communicate and interact with the terminal in real time, the programmable logic device may receive and recognize the time synchronization request message sent by the terminal by parsing all of the received messages.

The reception of the request message by the programmable logic device from the terminal may trigger generation of a time synchronization message, so as to complete the time synchronization of the terminal. In the present embodiment, when the programmable logic device receives the request message, the programmable logic device may acquire local reference time information, configuration indication information and recognition information of the terminal, and may add the local reference time information, the configuration indication information and the recognition information of the terminal into different fields respectively to generate a time synchronization message. Herein, the local reference time information is used to provide reference time for the terminal, the configuration indication information is used to indicate message contents needed when the programmable logic device configures a time synchronization initiating message or a time synchronization response message, and the recognition information of the terminal is used to represent address information of the terminal.

After generating a time synchronization message, the programmable logic device may send the time synchronization message to the corresponding terminal, so that the terminal may complete time synchronization.

In the present embodiment, when the programmable logic device receives a connection setup request message from the terminal, the programmable logic device may send the connection setup request message to the CPU. The CPU may obtain a connection setup response message by parsing the connection setup request message, and then send the connection setup response message to the programmable logic device, and after receiving the connection setup response message sent by the CPU. The programmable logic device may send the connection setup response message to the corresponding terminal, so that the terminal may complete connection setup communication. Furthermore, the programmable logic device may send the time synchronization initiating message to the corresponding terminal, so that the terminal may complete time synchronization. After generating a time synchronization response message upon receiving the time synchronization request message from the terminal, the programmable logic device may send the time synchronization response message to the corresponding terminal, so that the terminal may complete time synchronization.

In the abovementioned embodiment, before sending the connection setup response message, the time synchronization initiating message and the time synchronization response message, the programmable logic device may also judge a priority sequence or time sequence of the connection setup response message, the time synchronization initiating message and the time synchronization response message to obtain a judgment result. The programmable logic device may send the connection setup response message, the time synchronization initiating message and the time synchronization response message to the corresponding terminal according to the judgment result. That is, the programmable logic device may sort the connection setup response message, the time synchronization initiating message and the time synchronization response message in a descending order according to the priority sequence or sort the connection setup response message, the time synchronization initiating message and the time synchronization response message according to the time sequence, and send the connection setup response message, the time synchronization initiating message and the time synchronization response message to the terminal.

In the present embodiment, before sending the connection setup response message, the time synchronization initiating message and the time synchronization response message, the programmable logic device may extract state information of the connection setup response message, the time synchronization initiating message and the time synchronization response message, and send and store the state information into the CPU or memory. The state information is mainly used to query whether the connection setup response message, the time synchronization initiating message and the time synchronization response message are correctly and continuously sent during sending, i.e., whether a phenomenon of error or packet loss shows up.

Fourth Embodiment

FIG. 4 is a structural diagram of a single board provided in a fourth embodiment of the present disclosure. As shown in FIG. 4, the single board may include the abovementioned programmable logic device, the programmable logic device being located in a PHY layer.

In the single board, a CPU and an Ethernet interface are also included. The programmable logic device may be connected with the terminal through an Ethernet port. By utilizing the advantages that the CPU processes only a small number of connection setup communication messages, the programmable logic device may complete interaction of the connection setup communication messages with the CPU, so that the CPU may set up connection and communication with an external terminal. The programmable logic device may include N channels (N>1 and N is a positive integer), each channel being externally connected with the terminal through an Ethernet interface, so as to complete a time synchronization function of the terminal. It may be appreciated that the brand-new architecture provided in the second embodiment may be deployed in the programmable logic device by using, but not limited to, the following manners.

1. The brand-new architecture may exist in each channel. That is, N architectures may be included in the programmable logic device, and the internal architecture of each channel may be identical, so that each terminal accessed to the programmable logic device through an Ethernet interface can complete a corresponding function through a channel corresponding to the Ethernet interface.

2. The brand-new architecture may be shared by all channels. That is, only one architecture may be included in the programmable logic device, all Ethernet interfaces may be accessed to the same architecture. Therefore, each terminal may be accessed to the same architecture in the programmable logic device through the Ethernet interface to complete a corresponding function.

3. The brand-new architecture may exist in M (1<M<N, and M is a positive integer) channels. According to a connection between an Ethernet interface and a channel where the architecture exists, each terminal may be accessed to the channel where the architecture exists in the programmable logic device through the Ethernet interface to complete a corresponding function.

Fifth Embodiment

FIG. 5 is a structural diagram of an expansion application design of a machine frame single board provided in a fifth embodiment of the present disclosure. As shown in FIG. 5, the single board may include a primary clock board, a standby clock board and expansion boards. Reference time information may be transferred to the expansion boards from the primary clock board and the standby clock board by wiring in a machine frame, and single board expansion and channel expansion functions are provided for access of large-capacity users.

In the primary clock board, a GNSS or BITS clock serves as a clock source, and reference time information may be generated by utilizing the clock source and a local high-precision clock. The reference time information may be transferred to the expansion boards by wiring in the machine frame, and the GNSS and BITS clocks provide the reference time information for an accessed terminal by serving as NTP and PTP clocks through an Ethernet interface of each channel.

In the standby clock board, a GNSS or BITS clock serves as a clock source, and reference time information may be generated by utilizing the clock source and a local high-precision clock. The GNSS and BITS clocks may provide time information for an accessed terminal by serving as NTP and PTP clocks through an Ethernet interface of each channel. When the primary clock board dysfunctions, the reference time information may be provided for the expansion boards.

In case of many loaded users, the expansion boards may provide NTP and PTP time synchronization functions. The expansion boards may only provide the single board expansion and channel expansion functions, and the reference time information needed by the expansion boards may be transferred by the primary clock board or the standby clock board by wiring in the machine frame. Whether to configure the expansion boards, how many expansion boards are configured and what kind of machine frame is used to configure the expansion boards may be flexibly applied and selected.

The primary clock board and the standby clock board may be basically identical in structure. The difference only lies in that when the primary clock board is abnormal, the standby clock board may provide reference time information to the expansion boards. The difference between the expansion boards and the primary clock board or the standby clock board lies in that the primary clock board or the standby clock board may include a GNSS or BITS clock, and reference time information may be generated by taking the GNSS or BITS clock as a clock source and also adopting a local high-precision clock; however, the expansion boards do not include clock sources, the reference time information thereof basically comes from the primary clock board or the standby clock board. That is, the primary clock board or the standby clock board may transmit the reference time information to the expansion boards by wiring in the machine frame for later use for the expansion boards.

Sixth Embodiment

By means of a brand-new architecture design of the abovementioned programmable logic device, the packet transceiving capability may be completely decided by an Ethernet bandwidth of a system. The packet transceiving capability under Ethernet interfaces of 10M, 100M, 1000M and 10G will be respectively described hereinbelow.

(1) If an inter-system interface is the Ethernet interface of 1000M, a single-channel link bandwidth is 1000 Mbps. If 1% of the bandwidth of each link is dedicated to connection setup and communication of a signaling message, available bandwidths of NTP and PTP messages are 990 Mbps namely 123.75 MBps. If the NTP and PTP messages are IPV4-based UDP messages, the packet length of each NTP message is 90 Byte, and an additional frame interval is 12 Byte; meanwhile, in view of an 8 Byte VLAN requirement under special situations, the number of NTP messages which can be returned every second by each link channel is $123.75M/(90+12+8)=1.124*10^6$, and a single channel is capable of returning more than one million messages every second. PTP messages under a one-way mode mainly include a sync message and an announce message, the packet lengths are 90 byte and 110 byte respectively, the number of PTP messages which can be returned every second by each link channel is $123.75M/(90+8+12+110+8+12)=0.5156*10^6$, and a single channel is capable of returning more than 0.5 million sync and announce messages every second at the same time. Since a channel can be expanded into multi-path (such as common 8-path channel, 4-path channel, 12-path channel, and 16-path channel) and the expansion capability of the machine frame (a standard 1U machine frame expands 4 single boards, a 2U machine frame expands 8 single boards, and a 3U machine frame expands 12 single boards) is high, the device of this embodiment of the present disclosure in an Ethernet interface system of 1000M may be capable of sending tens of millions of packets every second while providing an NTP function and a PTP function. Meanwhile, due to independence between the channel and the expansion boards, the channel may flexibly provide the NTP and PTP functions.

(2) If an inter-system interface is the Ethernet interface of 100M, a single-channel link bandwidth is 100 Mbps. If 1% of the bandwidth of each link is dedicated to connection setup and communication of a signaling message, available bandwidths of NTP and PTP messages are 99 Mbps namely 12.375 MBps. If the NTP and PTP messages are IPV4-based UDP messages, the packet length of each NTP message is 90 Byte, and an additional frame interval is 12 Byte; meanwhile, in view of an 8 Byte VLAN requirement under special situations, the number of NTP messages which can be returned every second by each link channel is $12.375M/(90+12+8)=1.124*10^5$, and a single channel is capable of returning more than 0.1 million messages every second. PTP messages under a one-way mode mainly include a sync message and an announce message, the packet lengths are 90 byte and 110 byte respectively, the number of PTP messages which can be returned every second by each link channel is $12.375M/(90+8+12+110+8+12)=0.5156*10^5$, and a single channel is capable of returning more than fifty thousand sync and announce messages every second at the same time. Since a channel can be expanded into multi-path (such as common 8-path channel, 4-path channel, 12-path channel, and 16-path channel) and the expansion capability of the machine frame (a standard 1U machine frame expands 4 single boards, a 2U machine frame expands 8 single boards, and a 3U machine frame expands 12 single boards) is high, the device of this embodiment of the present disclosure in an Ethernet interface system of 100M may be capable of sending millions of packets every second while providing an NTP function and a PTP function. Meanwhile, due to independence between the channel and the expansion boards, the channel may flexibly provide the NTP and PTP functions.

(3) If an inter-system interface is the Ethernet interface of 10M, a single-channel link bandwidth is 10 Mbps. If 1% of the bandwidth of each link is dedicated to connection setup and communication of a signaling message, available bandwidths of NTP and PTP messages are 9.9 Mbps namely 1.2375 MBps. If the NTP and PTP messages are IPV4-based UDP messages, the packet length of each NTP message is 90 Byte, and an additional frame interval is 12 Byte; meanwhile, in view of an 8 Byte VLAN requirement under special situations, the number of NTP messages which can be returned every second by each link channel is $1.2375M/(90+12+8)=1.124*10^4$, and a single channel is capable of returning more than ten thousand messages every second. PTP messages under a one-way mode mainly include a sync message and an announce message, the packet lengths are 90 byte and 110 byte respectively, the number of PTP messages which can be returned every second by each link channel is $1.2375M/(90+8+12+110+8+12)=0.5156*10^4$, and a single channel is capable of returning more than five thousand sync and announce messages every second at the same time. Since a channel can be expanded into multi-path (such as common 8-path channel, 4-path channel, 12-path channel, and 16-path channel) and the expansion capability of the machine frame (a standard 1U machine frame expands 4 single boards, a 2U machine frame expands 8 single boards, and a 3U machine frame expands 12 single boards) is high, the device of this embodiment of the present disclosure in an Ethernet interface system of 10M may be capable of sending 0.1 million packets every second while providing an NTP function and a PTP function. Meanwhile, due to independence between the channel and the expansion boards, the channel may flexibly provide the NTP and PTP functions.

(4) If an inter-system interface is the Ethernet interface of 10G, a single-channel link bandwidth is 10 Gbps. If 1% of the bandwidth of each link is dedicated to connection setup and communication of a signaling message, available bandwidths of NTP and PTP messages are 9.9 Gbps namely 1.2375 GBps. If the NTP and PTP messages are IPV4-based UDP messages, the packet length of each NTP message is 90 Byte, and an additional frame interval is 12 Byte; meanwhile, in view of an 8 Byte VLAN requirement under special situations, the number of NTP messages which can be returned every second by each link channel is $1.2375G/(90+12+8)=1.124*10^7$, and a single channel is capable of returning more than ten million messages every second. PTP messages under a one-way mode mainly include a sync message and an announce message, the packet lengths are 90 byte and 110 byte respectively, the number of PTP messages which can be returned every second by each link channel is $1.2375G/(90+8+12+110+8+12)=0.5156*10^7$, and a single channel is capable of returning more than five million sync and announce messages every second at the same time. Since a channel can be expanded into multi-path (such as common 8-path channel, 4-path channel, 12-path channel, and 16-path channel) and the expansion capability of the machine frame (a standard 1U machine frame expands 4 single boards, a 2U machine frame expands 8 single boards, and a 3U machine frame expands 12 single boards) is high, the device of this embodiment of the present disclosure in an Ethernet interface system of 10G may be capable of sending hundreds of millions of packets every second while providing an NTP function and a PTP function. Meanwhile, due to independence between the channel and the expansion boards, the channel may flexibly provide the NTP and PTP functions.

The above is detailed illustrations of the present disclosure in conjunction with specific preferable implementation manners. The implementations of the present disclosure are not limited to these illustrations. Simple deductions or replacements made by a person of ordinary skill in the art without departing from the conception of the present disclosure shall be regarded as falling within the scope of protection defined by the appended claims of the present disclosure.

INDUSTRIAL APPLICABILITY

As above, a time synchronization method, a programmable logic device, a single board and a network element, provided by some embodiments of the present disclosure, have the beneficial effects as follows. A programmable logic device receives a time synchronization request message from a terminal, generates a time synchronization response message according to the time synchronization request message, and then sends the time synchronization response message to the terminal. The solution directs to a brand-new architecture design, and is applicable to all time synchronization systems such as a network element and a base station. The programmable logic device may complete framing and processing of the time synchronization response message, and directly complete receiving of the time synchronization request message and sending of the time synchronization response message. By virtue of this solution, the message processing capability can be comprehensively improved, so that the programmable logic device can take the place of a CPU to process the time synchronization response message and to provide a time synchronization function. Moreover, compared with a manner of receiving, processing and sending a message under the driving of interruption via the CPU, a high-frequency accurate timing manner possessed by the programmable logic device enables a packet sending interval to be more accurate, so that the time synchronization performance may be further optimized, and the situation of limited packet transceiving capability caused by the limitation of a CPU architecture can be avoided. In addition, problems of non-accurate packet sending interval and the like caused by blockage and delay probably occurring when a message is sent to a PHY layer and stamped with a timestamp after being framed in an application layer are avoided, so that an effect of enabling a bandwidth resource of the Ethernet to decide the message transceiving capability may be achieved to the greatest extent.

What is claimed is:

1. A time synchronization method, comprising:
   receiving, by a programmable logic device, a Network Time Protocol (NTP) or Precision Timing Protocol (PTP)-based connection setup request message from a terminal, wherein the programmable logic device comprises one or more channels which are externally connected with terminals;
   generating, by the programmable logic device, a time synchronization message according to the NTP or PTP-based connection setup request message; and
   sending, by the programmable logic device, the time synchronization message to the terminal;
   wherein generating, by the programmable logic device, a time synchronization message according to the NTP or PTP-based connection setup request message comprises:
   sending, by the programmable logic device, the NTP or PTP-based connection setup request message to a Central Processing Unit (CPU);
   receiving, by the programmable logic device, the configuration indication information and the recognition information of the terminal from the CPU;
   acquiring, by the programmable logic device, the local reference time information according to the configuration indication information; and
   generating, by the programmable logic device according to the configuration indication information, the recognition information of the terminal and the local reference time information, an NTP or PTP-based time synchronization initiating message as the time synchronization message.

2. The time synchronization method as claimed in claim 1, further comprising:
   receiving, by the programmable logic device, an NTP or PTP-based time synchronization request message from the terminal.

3. The time synchronization method as claimed in claim 2, wherein after receiving, by the programmable logic device, an NTP or PTP-based time synchronization request message from the terminal, the method further comprises:
   generating, by the programmable logic device, a time synchronization message according to the NTP or PTP-based time synchronization request message, comprising:
   parsing, by the programmable logic device, the NTP or PTP-based time synchronization request message, and acquiring type identification information of the NTP or PTP-based time synchronization request message and recognition information of the terminal;
   acquiring, by the programmable logic device, configuration indication information and local reference time information according to the type identification information; and
   generating, by the programmable logic device according to the configuration indication information, the recognition information of the terminal and the local reference time information, a NTP or PTP-based time synchronization response message as the time synchronization message.

4. The time synchronization method as claimed in claim 3, wherein
   when identification information of the NTP or PTP-based connection setup request message indicates the NTP or PTP-based connection setup request message as a PTP request message, the local reference time information acquired by the programmable logic device is local PTP reference time information, and the received configuration indication information is PTP configuration indication information;
   when identification information of the NTP or PTP-based connection setup request message indicates the NTP or PTP-based connection setup request message as an NTP request message, the local reference time information acquired by the programmable logic device is local NTP reference time information, and the received configuration indication information is NTP configuration indication information;
   when identification information of the NTP or PTP-based time synchronization request message indicates the NTP or PTP-based time synchronization request message as a PTP request message, the local reference time information and configuration indication information acquired by the programmable logic device are local PTP reference time information and PTP configuration indication information respectively; and
   when identification information of the NTP or PTP-based time synchronization request message indicates the NTP or PTP-based time synchronization request message as an NTP request message, the local reference time information and configuration indication information acquired by the programmable logic device are local NTP reference time information and NTP configuration indication information respectively.

5. The time synchronization method as claimed in claim 4, wherein when the identification information of the NTP or PTP-based connection setup request message or the NTP or PTP-based time synchronization request message indicates the NTP or PTP-based connection setup request message or the NTP or PTP-based time synchronization request message as a PTP request message, acquiring, by the programmable logic device, local PTP reference time information comprises:

acquiring clock source information;

synchronizing local clock information according to the clock source information; and acquiring the local PTP reference time information according to the local clock information;

when the identification information of the NTP or PTP-based connection setup request message or the NTP or PTP-based time synchronization request message indicates the NTP or PTP-based connection setup request message or the NTP or PTP-based time synchronization request message as an NTP request message, acquiring, by the programmable logic device, local NTP reference time information comprises:

acquiring clock source information;

synchronizing local clock information according to the clock source information;

acquiring local PTP reference time information according to the local clock information; and converting the local PTP reference time information into the local NTP reference time information.

6. The time synchronization method as claimed in claim 1, wherein before the programmable logic device sends the time synchronization message to the terminal, the method further comprises:

extracting, by the programmable logic device, state information of the time synchronization message; and sending out, by the programmable logic device, the state information.

7. The time synchronization method as claimed in claim 1, wherein the programmable logic device is located in a Physical (PHY) layer.

8. The time synchronization method as claimed in claim 2, wherein before the programmable logic device sends the time synchronization message to the terminal, the method further comprises:

extracting, by the programmable logic device, state information of the time synchronization message; and sending out, by the programmable logic device, the state information.

9. A time synchronization method, comprising:

sending, by a terminal, a Network Time Protocol (NTP) or Precision Timing Protocol (PTP)-based connection setup request message to a programmable logic device, wherein the programmable logic device comprises one or more channels which are externally connected with terminals;

receiving, by the terminal, a time synchronization message from the programmable logic device, and completing, by the terminal, time synchronization, wherein the time synchronization message is generated by the programmable logic device according to the NTP or PTP-based connection setup request message and sent to the terminal;

wherein the time synchronization message is generated by the programmable logic device according to the NTP or PTP-based connection setup request message in a following manner:

sending, by the programmable logic device, the NTP or PTP-based connection setup request message to a Central Processing Unit (CPU);

receiving, by the programmable logic device, the configuration indication information and the recognition information of the terminal from the CPU;

acquiring, by the programmable logic device, the local reference time information according to the configuration indication information; and generating, by the programmable logic device according to the configuration indication information, the recognition information of the terminal and the local reference time information, an NTP or PTP-based time synchronization initiating message as the time synchronization message.

10. A system comprising a programmable logic device and a terminal for connection setup, the programmable logic device comprising one or more channels which are externally connected with terminals, and further comprising:

a receiving module, configured to receive a Network Time Protocol (NTP) or Precision Timing Protocol (PTP)-based connection setup request message from a terminal;

a processing module, configured to generate a time synchronization message according to the NTP or PTP-based connection setup request message received by the receiving module, wherein the processing module comprises: an acquisition module, configured to acquire local reference time information, configuration indication information, and recognition information of the terminal according to the request message received by the receiving module; and a generation module, configured to generate the time synchronization message according to the local reference time information, the configuration indication information, and the recognition information of the terminal, which are acquired by the acquisition module; and a sending module, configured to send the time synchronization message generated by the processing module to the terminal;

wherein the sending module is further configured to send the NTP or PTP-based connection setup request message to a Central Processing Unit (CPU);

the receiving module is further configured to receive the configuration indication information and the recognition information of the terminal from the CPU;

the acquisition module is configured to acquire the local reference time information according to the configuration indication information; and the generation module is configured to generate, according to the configuration indication information, the recognition information of the terminal and the local reference time information, an NTP or PTP-based time synchronization initiating message as the time synchronization message.

11. The programmable logic device as claimed in claim 10, wherein the receiving module is further configured to receive an NTP or PTP-based time synchronization request message from the terminal.

12. The programmable logic device as claimed in claim 11, wherein when the receiving module receives the NTP or PTP-based time synchronization request message from the terminal, the processing module further comprises a parsing module, configured to parse the NTP or PTP-based time synchronization request message, and acquire type identification information of the NTP or PTP-based time synchronization request message and recognition information of the terminal;

the acquisition module is configured to acquire configuration indication information and local reference time information according to the type identification information acquired by the parsing module; and the generation module is configured to generate, according to the configuration indication information, the recognition information of the terminal and the local reference time information, an NTP or PTP-based time synchronization response message as the time synchronization message.

13. The programmable logic device as claimed in claim 12, wherein when identification information of the NTP or PTP-based connection setup request message received by the receiving module indicates the NTP or PTP-based connection setup request message as a PTP request message, the local reference time information acquired by the acquisition module is local PTP reference time information, and the configuration indication information received by the receiving module is PTP configuration indication information;

when identification information of the NTP or PTP-based connection setup request message received by the receiving module indicates the NTP or PTP-based connection setup request message as an NTP request message, the local reference time information acquired by the acquisition module is local NTP reference time information, and the configuration indication information received by the receiving module is NTP configuration indication information;

when identification information of the NTP or PTP-based time synchronization request message received by the receiving module indicates the NTP or PTP-based time synchronization request message as a PTP request message, the local reference time information and configuration indication information acquired by the acquisition module are local PTP reference time information and PTP configuration indication information respectively; and when identification information of the NTP or PTP-based time synchronization request message received by the receiving module indicates the NTP or PTP-based time synchronization request message as an NTP request message, the local reference time information and configuration indication information acquired by the acquisition module are local NTP reference time information and NTP configuration indication information respectively.

14. The programmable logic device as claimed in claim 13, wherein when the identification information of the NTP or PTP-based connection setup request message or the NTP or PTP-based time synchronization request message indicates the NTP or PTP-based connection setup request message or the NTP or PTP-based time synchronization request message as a PTP request message, the acquisition module is configured to acquire clock source information, synchronize local clock information according to the clock source information, and acquire local PTP reference time information according to the local clock information; and when the identification information of the NTP or PTP-based connection setup request message or the NTP or PTP-based time synchronization request message indicates the NTP or PTP-based connection setup request message or the NTP or PTP-based time synchronization request message as an NTP request message, the acquisition module is configured to acquire clock source information, synchronize local clock information according to the clock source information, acquire local PTP reference time information according to the local clock information, and convert the local PTP reference time information into local NTP reference time information.

15. The programmable logic device as claimed in claim 10, wherein the processing module further comprises:

an extraction module, configured to extract state information of the time synchronization message, wherein the sending module is configured to send out the state information extracted by the extraction module.

16. A single board, comprising an interface as well as the programmable logic device as claimed in claim 10, the programmable logic device being connected to a terminal via the interface.

17. The single board as claimed in claim 16, wherein the programmable logic device is located in a Physical (PHY) layer.

18. A network element, comprising at least one single board as claimed in claim 16, the single board being externally connected with at least one terminal.

* * * * *